Feb. 10, 1959     E. R. KNOWLES     2,872,700
APPARATUS FOR INJECTION MOLDING OF PLASTIC BOTTLES
Filed April 19, 1955     4 Sheets-Sheet 1

INVENTOR
EDWARD R. KNOWLES
BY
Curtis, Morris & Safford
ATTORNEYS

INVENTOR
EDWARD R. KNOWLES
BY
Curtis, Morris & Safford
ATTORNEYS

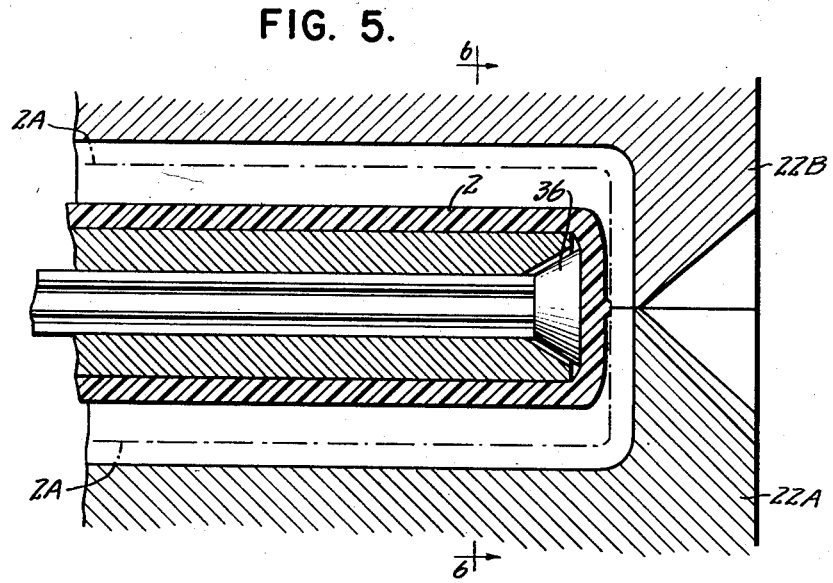
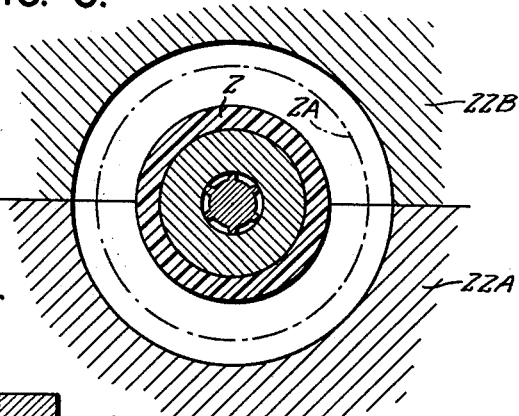
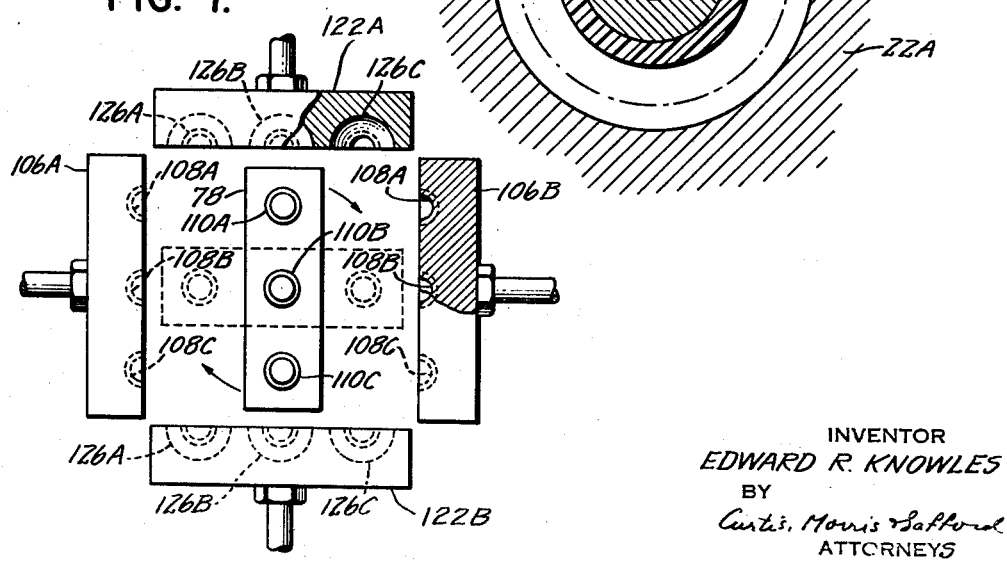

ated Feb. 10, 1959

2,872,700

APPARATUS FOR INJECTION MOLDING OF PLASTIC BOTTLES

Edward R. Knowles, Fairfield, Conn., assignor, by mesne assignments, to The Specialty Papers Company, Dayton, Ohio, a corporation of Ohio Application April 19, 1955, Serial No. 502,283

5 Claims. (Cl. 18—5)

This invention relates to apparatus for forming hollow plastic articles and is described particularly as embodied in a machine for manufacturing flexible plastic bottles, for example from polyethylene. Cross reference is made to my copending application S. N. 399,502, filed December 21, 1953.

Various ways have been proposed for making hollow plastic articles. In general, a plastic tube or envelope is formed and placed in a mold and, while the plastic tube or mold is heated to its softening point, inflated by blowing air into the interior of the tube or envelope. In one well known method a short tube of heat-softened plastic material is placed within a mold and then inflated so that it conforms with the shape of the mold cavity. In another system, the leading end of a plastic tube is sealed as it is being extruded and is extruded directly into a vertical mold cavity. The air for inflation is then admitted through the extruder mechanism while the plastic tube is still attached to the extruder. In another apparatus, the mold is clamped onto a tube of softened plastic material and a hollow needle introduced into the mold perforates the plastic wall. Air is then admitted into the plastic through the hollow needle to inflate the plastic.

It will be seen that in each of these systems the plastic tube, which serves as a preform, must be transferred to the mold and must be kept hot enough to blow or else it must be reheated after it is placed in the mold.

It has been proposed also to form the preform, or parison, by injection molding, but the problem of transferring the parison from the injection mold to the article-forming mold has not been solved in such manner as to permit successful commercial operation. The parison must be maintained in a heat-softened condition because it is too expensive and too slow to re-heat the parison after it is placed in the article mold. Moreover, the parison cannot be removed from the core of the injection mold around which it is formed because the soft plastic will immediately lose its shape.

However, the formation of the parison by injection molding has a number of advantages. For one thing, finishing operations subsequent to the molding of the article can be completely eliminated. For example, in the manufacture of bottles, the inside of the neck can be finished smoothly and accurately thus eliminating any need to ream the neck of the bottle. The outer surfaces and threads of the bottle also are formed accurately and are fully finished in the mold.

The present invention provides an improved system for handling and transferring the parison and is described as incorporated in a bottle-forming machine that overcomes disadvantages of earlier machines.

In a preferred form of the invention, a parison of plastic material is formed by injection molding around a core positioned within a mold cavity. The two separable parts of the mold are then moved away from the core which continues to support the parison, and two parts of a second mold which have interior cavities in the shape of the article to be molded are positioned around the central core. After the article-forming mold is positioned around the parison, which is accomplished while the parison is still hot from the injection molding and before it has cooled to a substantial extent, air at super-atmospheric pressure is admitted into the parison which is expanded by the air-pressure to conform to the interior of the mold cavity.

As soon as the blowing operation is complete, the two halves of the article-forming mold are opened and the hollow plastic article is blown off of the core by the admission of air under greater pressure.

One important feature of this machine is that the parison mold halves, the halves of the article-forming mold, and the parison core are all mounted on a carriage plate with the parts of the parison mold having opening and closing movements in directions at right angles to the directions of movement of the two parts of the article-forming mold when opening and closing.

The carriage plate is mounted for transverse movement to position the parison mold for the injection operation and also to provide a simple and effective way of clamping the two halves of the parison mold together during injection of the plastic. The neck portion of the molded article is properly shaped and finished in the molds so that no subsequent reaming, cutting, or polishing operations are required. The molding system described herein is readily incorporated into an automatic arrangement for the making of plastic articles and requires a minimum of supervision. These and other objects, aspects and advantages of the invention will be in part pointed out and in part apparent from the following description of a preferred embodiment of the invention considered together with the accompanying drawings, in which:

Figure 5 is an enlarged partial sectional view showing the parison within the bottle mold ready to be inflated;

Figure 6 is a partial sectional view taken along line 6—6 of Figure 5; and

Figure 7 is a vertical sectional view of a modified form of the machine for making three plastic bottles simultaneously.

Figure 2:
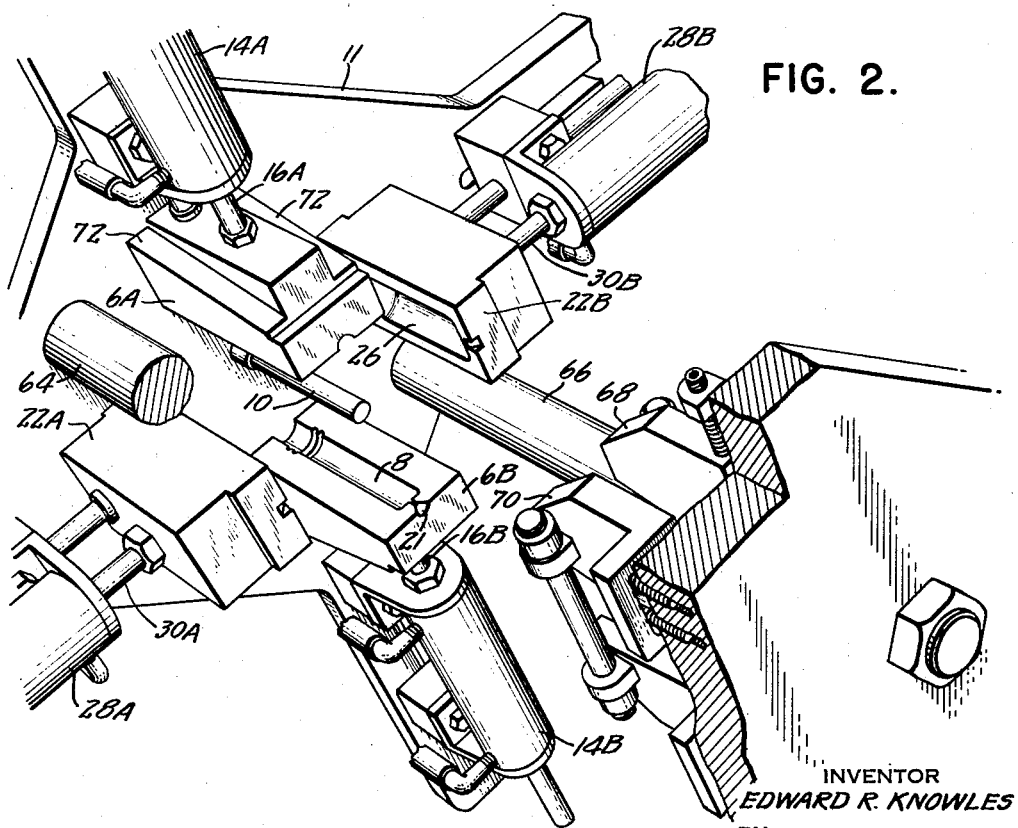
Figure 2 is a partial perspective view of the arrangement of the molds and parison core on the carriage plate.
Figure 3:
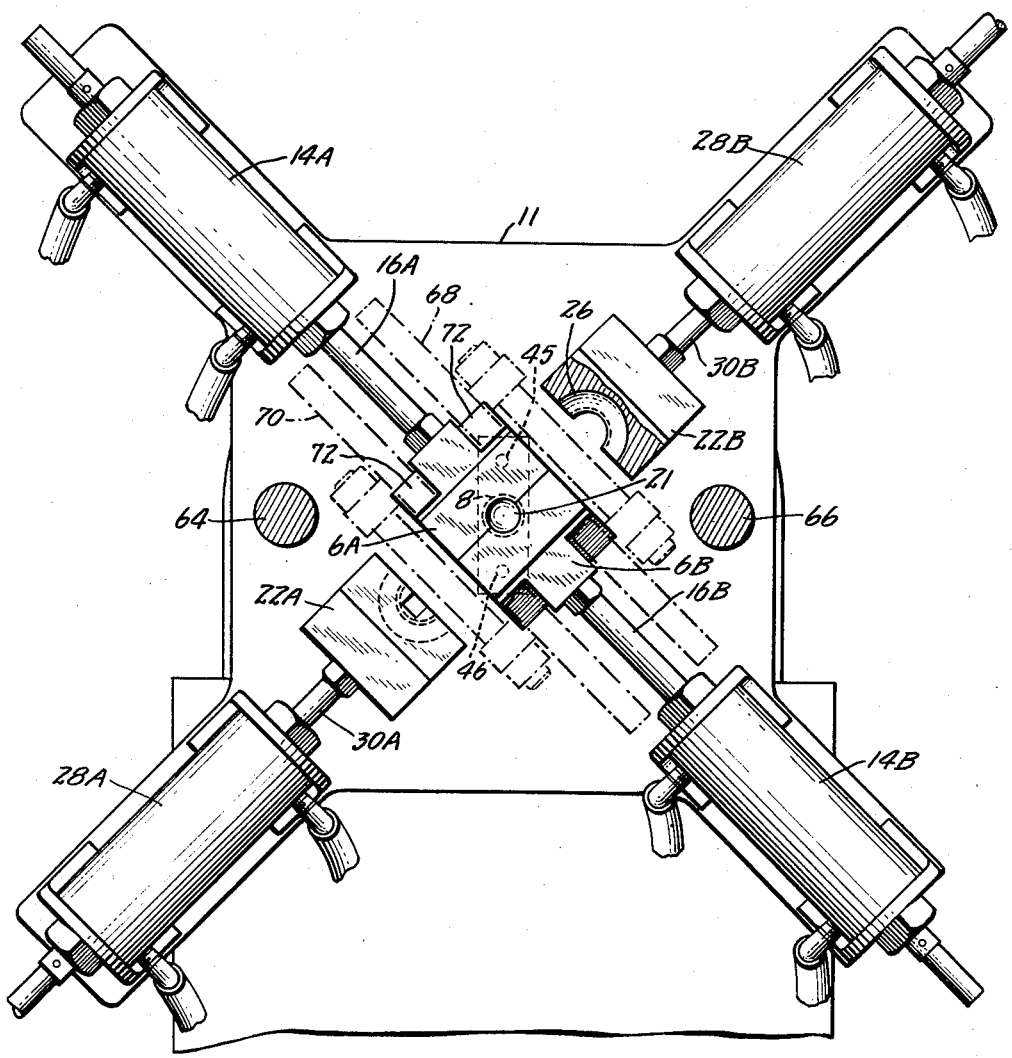
Figure 3 is a transverse vertical sectional view looking toward the carriage with the parison mold in closed position.

The apparatus by which the articles are formed will be described in conjunction with a description of the steps in the formation of the plastic articles. A parison 2 (best illustrated in Figures 4 and 5) is formed in substantially tubular form with one closed end, as indicated at 4, so that the parison has somewhat the shape of a vial. This parison is formed within a mold 6 which comprises two separable halves 6A and 6B (Figure 2). These mold halves 6A and 6B are arranged to move toward each other into face-to-face relationship and form an internal molding cavity 8 by which the parison 2 is shaped in conjunction with an internal cylindrical core 10 which projects into the mold cavity 8. In order to form the neck-portion of the molded article, the mold cavity 8 extends all the way to one end of the mold and terminates at the forward face of a carriage plate 11 that carries the core 10 and mold 6.

In order to control the opening and closing of the mold halves 6A and 6B, each of the mold halves is slidably mounted on the face of the plate 11 and are opened and closed by means of two hydraulic cylinders 14A and 14B which are connected respectively to the mold halves 6A and 6B. These hydraulic cylinders are constructed in the usual manner and are provided with movable pistons which are connected to shafts 16A and 16B respectively by which the forces are applied to the halves of the mold. Thus in order to close the molds for formation of the parison by injection, the hydraulic cylinders 14A and 14B are actuated to bring the two mold halves 6A and 6B together in face-to-face relationship. A locking arrangement for holding the molds in closed position without the necessity for great hydraulic pressure to prevent the molds from opening during the injection process will be described subsequently.

In order to form the parison 2 around the core 10, heat-softened plastic material, such as polyethylene, the mold halves 6A and 6B are closed by the hydraulic cylinders 14A and 14B and the carriage 11 is moved toward the right (as viewed in Figure 1) by a hydraulic cylinder 18. The molten plastic is then injected by a conventional injection molding machine 19 through an injection nozzle generally indicated at 20. The plastic is admitted through a conical orifice 21 (Figure 2) into the cavity 8. The apparatus by which the injection of plastic under high pressure, for example 20,000 lbs. per sq. inch, is accomplished, is of conventional design and therefore need not be described in detail here. It is sufficient to point out that the injection nozzle 20 (Figure 2) is arranged to move into engagement with the recess 21 in one end of the parison-forming mold 6 and to inject the heated plastic material through the orifice into the space between the interior of the mold 6 and the central cylindrical core 10. As soon as this molding operation is complete, the carriage 11 is moved toward the left to the position shown in Figure 1, and the mold is opened by means of the cylinders 14A and 14B which are now actuated to retract the mold portions 6A and 6B away from the core 10.

As soon as the parison-forming mold 6 has been separated and the respective parts moved to their retracted positions, and while the parison 2 is still hot, the article-forming mold 22 which comprises two separable sections 22A and 22B (Figure 2) positioned on the opposite sides of the core 10 and arranged for sliding movement in directions perpendicular to the movement of the mold portions 6A and 6B, are moved together into face-to-face relationship around the core 10 and the parison 2. The mold portions 22A and 22B are provided with an internal cavity 26 which corresponds to the shape of the article which is to be blown or vacuum-formed. The mold-halves 22A and 22B are closed by means of two hydraulic cylinders 28A and 28B, similar to those previously described, which are connected respectively to the mold portions 22A and 22B by shafts 30A and 30B. These mold portions are displaced 90° from the halves of the parison molds and when suitable hydraulic pressure is applied to the cylinders 28A and 28B, the two mold-portions 22A and 22B move inwardly and are in face-to-face relationship around the parison 2, the internal cavity of the mold being shaped so as to form a completed neck on the blown plastic article. For example, if a bottle is to be formed, as is indicated by the mold shapes in the drawing, the interior of the neck is provided with the desired shape and finish by the contour of the core 10, and the outer surface of the neck is provided with the desired contour and finish by the shape of the cavity 26.

As soon as the article-forming mold 22 is closed, air is injected under pressure into the interior of the parison 2. This is accomplished by means of a pin 34 (Figure 4) which extends lengthwise within the core 10 and which is provided with a tapered head portion 36 at the end of the core adjacent the closed end of the parison 2, the pin being longitudinally movable within the core 10 against the force of a compression spring 38 which surrounds a portion of the pin 34 and extends between a head 40 on the opposite end of the pin 34 and an internal shoulder 42 on the core 10. Air under pressure is supplied to the interior of the core 10 through a central opening in a core-actuating shaft 44.

Figure 1:
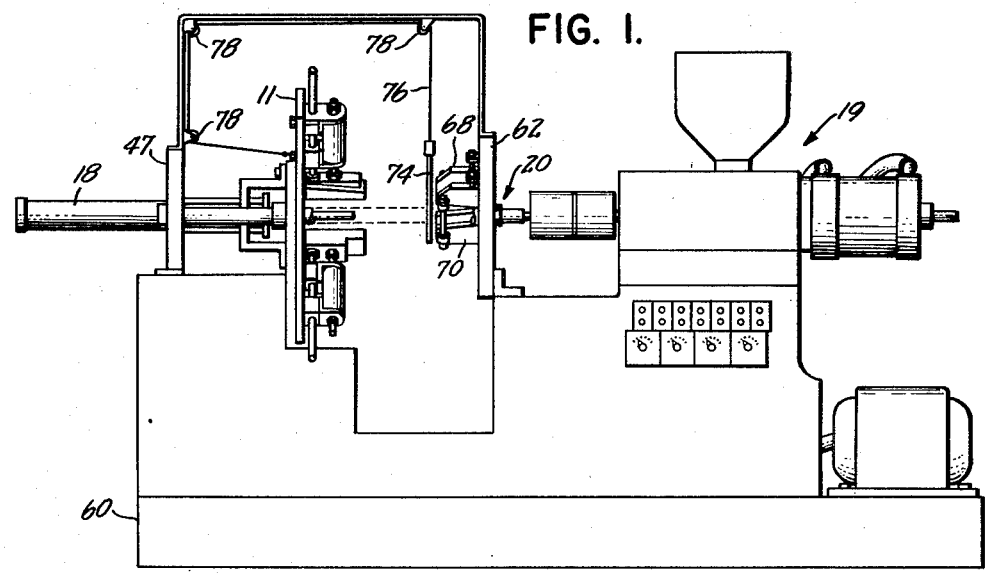
Figure 1 is an elevational view of a bottle-forming machine incorporating the invention.

When the carriage 11 returns to the position shown in Figure 1, a pair of push rods 45 and 46 abut an end plate 47 causing an air control pin 48, carried on a cross member 49 secured to the push rods 45 and 46, to strike a movable plug 50, which is secured to the hollow shaft 44, and move the core pin 34 to the right. This movement of the core pin moves the head 36 slightly away from the core 10 so as to leave a slight conical space around the head 36 as best shown in Figure 5. The air enters the core 10 through a passageway 51 and a slidable air connection 52 and passes around the head 40 and then along spaces formed between the pin 34 and the core 10, these spaces being provided by the fluted outer surface of the pin 34 as best shown in Figure 6. The air then passes through the space between the head 36 and the core 10, and is thus applied to the inner surface of the parison 2. The parison 2, which is still in softened condition, is blown outwardly to assume the shape of the cavity of the article-forming mold, for example, as indicated by the broken line 2A in Figure 5.

As soon as the parison has been inflated to conform with the shape of the mold, the pressure is released from within the mold and the mold is opened.

The molded article is then removed from the core pin by the application of increased air pressure to the interior of the article.

The various mechanisms for the mechanical operation of the system are not described in detail here as such mechanisms are already well-known. The various parts are supported in any desired manner, and for example may be mounted on a heavy steel base 60 (Figure 1) which supports both the molding apparatus and the injection mechanism 19. This base provides a rigid support for the end plate 47 and for a second supporting plate 62. A pair of carriage-supporting rods 64 and 66 (best shown in Figure 4) extend between the plates 47 and 62 and provide a slidable support for the carriage 11.

Figure 4:
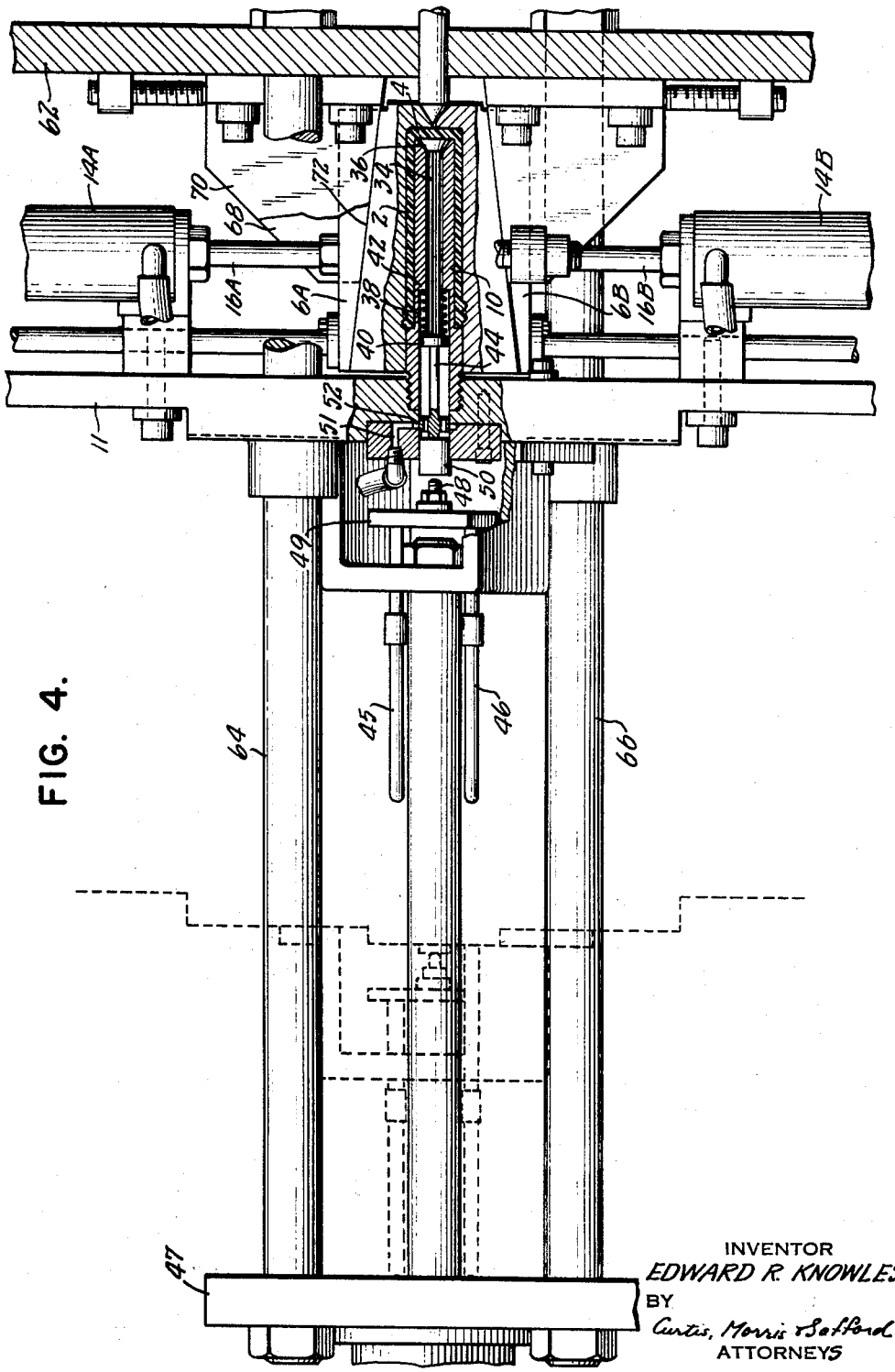
Figure 4 is a partial longitudinal vertical sectional view showing the parison mold in the position in which the plastic is injected.

In order to hold the injection mold halves 6A and 6B in closed position during injection, the mold is arranged to wedge between two pairs of locking members 68 and 70, mounted on the face of the supporting plate 62, when the carriage moves to its injection position (see Figures 1 and 4). Each of the parison mold halves 6A and 6B is provided with two sloping cam surfaces 72, best shown in Figure 2, which wedge between opposing surfaces on the locking members 68 and 70 thereby securing the two mold halves together during the injection of the plastic.

When the molded articles are blown off the core 10, they are prevented from entering the space between the mold locking members 68 and 70 and perhaps lodging there by a deflecting plate 74. This deflecting plate is suspended by a cable 76 which passes over pulleys 78 and is secured to the carriage 11 so that as the carriage moves up to the injection position, the deflecting plate 74 is lifted out of the way.

In order to permit the fastest possible cycle, the rear portion of the core pin 10, which forms the neck of the bottle, is cooled by water flowing through this portion of the core so that the plastic is cooled by the time the bottle is blown off. This cooling is important also in preventing the plastic from adhering to the core 10. The remainder of the core pin is heated by the plastic and thus permits the plastic to remain in softened condition until the bottle is blown.

The portion of the mold which forms the neck of the bottle should also be cooled for maximum production rate. This is accomplished readily by circulating cold water through this portion of the mold and providing suitable insulation between this portion of the mold and the part which forms the body of the bottle. The latter part of the bottle mold is heated by circulating steam through it in the usual manner. For example, the mold can be formed of beryllium copper and the two portions of the mold can be heat-insulated by a slot extending transversely from the back almost through the mold. As soon as the bottle is blown, cold water is circulated through all of the mold so that the plastic is cool enough to retain its form when the mold is opened.

The air for blowing the bottle and for blowing it off the core 10 is introduced through the same air channel, but higher pressure is used to blow the bottle off. After the bottle is released, the flow of air through the core 10 is permitted to continue for a short period, about two seconds, to cool the core.

The electrical and hydraulic connections for controlling the cycle of operation are not illustrated as they are well-known in this field and do not in themselves form part of the present invention. The amount of heat which is required to be supplied depends to a considerable extent upon the rapidity with which the operation takes place, and the size and shape of the articles being molded. If desired, additional means may be provided for keeping the parison 2 in soft condition while the parison mold 6 is being opened and the article-mold 22 is being closed around the parison. For example, lamps or other heaters may be positioned to provide substantially uniform heating of the parison. Similar radiant heaters can be utilized also to maintain the molds at the desired operating temperature.

Figure 7 illustrates an arrangement by which three bottles are formed simultaneously, thus increasing the capacity of the machine three-fold. In this instance three core pins 110A, 110B, and 110C, are secured to a supporting plate 78 which is rotatably secured to the carriage 11. The parison mold halves 106A and 106B are provided with three cavities 108A, 108B, and 108C. The bottle mold halves 122A and 122B are arranged to form three cavities 126A, 126B, and 126C. The injection orifices in this example are identical with the orifice 21 except that a flush orifice is used instead of the conical orifice so that the injection nozzle abuts but does not enter the parison mold. This is because three separate spaced injection nozzles are used in this arrangement, and alignment problems are thereby minimized.

The operation is the same as described above except that after the three parisons are formed and the mold halves 106A and 106B retracted, the plate 78 is rotated 90° to the position shown in broken lines so that the bottle mold cavities each close around one of the parisons. After the bottles are blown off, the plate 78 is returned to the position shown in Figure 7. The remaining parts of the machine may remain as previously described.

From the foregoing, it will be seen that the present invention is well-adapted to carry out the ends and objects hereinbefore set forth and that it can be manufactured readily from conventional materials by fabrication techniques in common use. It will be apparent that the described embodiment of the invention can be modified in various ways to best suit it for each particle application. For example, the hydraulic cylinders can be operated by any desired media, either liquid or gaseous, or they may be replaced entirely by any other mechanical driving system such as a toggle arrangement. The shape of the parison can be varied at will and the wall thickness can be controlled so as to produce a wall of uniform thickness in the blown plastic article. These and other modifications all coming within the scope of the present invention will occur to those skilled in this art in the application of this invention to a particular use.

What is claimed is:

1. Molding apparatus comprising a supporting carriage, a track slidably supporting said carriage, drive means arranged to move said carriage along said track between first and second positions, a parison mold comprising two separable parts, means movably securing the parts of said parison mold to said carriage, power means for opening and closing said parison mold, jaw means arranged to encompass said parison mold when said carriage is in said second position, plastic injection means arranged to force plastic into said parison mold while it is encompassed by said jaws, an article mold comprising two separable parts, means movably securing the parts of said article mold to said carriage, and power means for opening and closing said article mold, said article mold being arranged for opening and closing movements along paths at right angles to the direction of opening and closing movements of said parison mold.

2. Apparatus for forming hollow plastic articles comprising in combination a parison mold formed in two separable parts, a central mold core, power means for moving said separable parison mold parts toward each other into a closed position in face-to-face engagement around said central core, an article mold formed of two separable parts, means for moving said two article mold parts together into a closed position in face-to-face engagement around said central core and along a line of movement angularly removed from that of said parison mold parts, plastic injection means for injecting softened plastic under substantial injecting pressure into said parison mold when in said closed position to form a parison around said core, jaw means adjacent said plastic injection means for clamping said two parts of said parison mold in said closed position to withstand said substantial injecting pressure, and means for introducing air under a substantially less pressure than said plastic injecting pressure through said central core when said article mold is in said closed position around said core and a parison thereon for blowing said parison to fill and conform to said article mold.

3. Apparatus for forming hollow plastic articles comprising in combination a parison mold formed in two separable parts, a central mold core, power means for moving said separable parison mold parts toward each other into a closed position in face-to-face engagement around said central core, an article mold formed of two separable parts, means for moving said two article mold parts together into a closed position in face-to-face engagement around said central core and along a line of movement angularly removed from that of said parison mold parts, plastic injection means for injecting softened plastic under substantial injecting pressure into said parison mold when in said closed position to form a parison around said core, jaw means adjacent said plastic injection means for clamping said two parts of said parison mold in said closed position, cam surfaces on the outside of said parison mold parts for engagement with said jaw means for wedging said two parts together to withstand said substantial injecting pressure, and means for introducing air under a substantially less pressure than said plastic injecting pressure through said central core when said article mold is in said closed position around said core and a parison thereon for blowing said parison to fill and conform to said article mold.

4. Apparatus for forming hollow plastic articles comprising in combination a parison mold formed in two separable parts, a central mold core, power means for moving said separable parison mold parts toward each other into a closed position in face-to-face engagement around said central core, an article mold formed of two separable parts, means for moving said two article mold parts together into a closed position in face-to-face engagement around said central core and along a line of movement angularly removed from that of said parison mold parts, plastic injection means for injecting softened plastic under substantial injecting pressure into said parison mold when in said closed position to form a parison around said core, means for mounting all said mold parts and said central core for movement toward and away from said plastic injection means, jaw means adjacent said plastic injection means for clamping said two parts of said parison mold in said closed position to withstand said substantial injecting pressure, and means for introducing air under a substantially less pressure than said plastic injecting pressure through said central core when said article mold is in said closed position around said core and a parison thereon for blowing said parison to fill and conform to said article mold.

5. Apparatus for forming hollow plastic articles comprising in combination a parison mold formed in two separable parts, a central mold core, power means for moving said separable parison mold parts toward each other into a closed position in face-to-face engagement around said central core, an article mold formed of two separable parts, means for moving said two article mold parts together into a closed position in face-to-face engagement around said central core and along a line of movement angularly removed from that of said parison mold parts, plastic injection means for injecting softened plastic under substantial injecting pressure into said parison mold when in said closed position to form a parison around said core, means for mounting all said mold parts and said central core for movement toward and away from said plastic injection means, jaw means adjacent said plastic injection means for clamping said two parts of said parison mold in said closed position, cam surfaces on the outside of said parison mold parts for engagement with said jaw means for wedging said two parts together to withstand said substantial injecting pressure, and means for introducing air under a substantially less pressure than said plastic injecting pressure through said central core when said article mold is in said closed position around said core and a parison thereon for blowing said parison to fill and conform to said article mold.

References Cited in the file of this patent

UNITED STATES PATENTS

| | | |
|---|---|---|
| 998,824 | Winder | July 25, 1911 |
| 2,298,716 | Moreland et al. | Oct. 13, 1942 |
| 2,335,419 | Johnston | Nov. 30, 1943 |
| 2,358,857 | Gits | Sept. 26, 1944 |
| 2,519,255 | Knowles | Aug. 15, 1950 |

FOREIGN PATENTS

| | | |
|---|---|---|
| 154,343 | Austria | Nov. 27, 1953 |

UNITED STATES PATENT OFFICE
CERTIFICATE OF CORRECTION

February 10, 1959

Patent No. 2,872,700

Edward R. Knowles

It is hereby certified that error appears in the printed specification of the above numbered patent requiring correction and that the said Letters Patent should read as corrected below.

Column 8, line 23, list of references cited, under the heading "Foreign Patents" for "Austria" read -- Australia --.

Signed and sealed this 7th day of July 1959.

(SEAL)
Attest:

KARL H. AXLINE
Attesting Officer

ROBERT C. WATSON
Commissioner of Patents